United States Patent [19]

Alfano et al.

[11] 4,277,669

[45] Jul. 7, 1981

[54] METHOD AND DEVICE FOR DETECTING THE THRESHOLD OF GENERATION OF A LASER BEAM

[75] Inventors: Robert R. Alfano, Riverdale; Norman H. Schiller, Whitestone, both of N.Y.

[73] Assignee: Hamamatsu T.V. Co, Ltd, Hamamatsu, Japan

[21] Appl. No.: 55,145

[22] Filed: Jul. 6, 1979

[51] Int. Cl.³ .............................................. B23K 27/00
[52] U.S. Cl. .......................... 219/121 LK; 219/121 L; 219/121 LL; 219/121 LM
[58] Field of Search ................. 219/121 LA, 121 LG, 219/121 LH, 121 LJ, 121 LK, 121 LL, 121 L, 121 LM, 121 N, 121 LP, 121 LB; 331/94.5 Q

[56] References Cited

U.S. PATENT DOCUMENTS

| | | | |
|---|---|---|---|
| 3,553,421 | 1/1971 | Schawlow | 219/121 LJ |
| 3,889,272 | 6/1975 | Lou et al. | 219/121 LB X |
| 4,087,672 | 5/1978 | Yi | 219/121 LB X |

OTHER PUBLICATIONS

J. A. Parisi, *IBM Technical Disclosure Bulletin*, "Integrated Resistor Trimming", vol. 17, No. 10, p. 2878, Mar., 1975.

*Primary Examiner*—C. L. Albritton
*Attorney, Agent, or Firm*—Moonray Kojima

[57] ABSTRACT

Method and device for detecting the threshold of generation of a non-visible laser beam, wherein a dark colored film, enclosed in a transparent container, is placed in the path of the laser beam to cause the dark film to burn when the laser beam impinges thereon and wherein the transparent container prevents the vaporized film particles from the area impinged upon by the laser beam from escaping into the atmosphere.

12 Claims, 6 Drawing Figures

METHOD AND DEVICE FOR DETECTING THE THRESHOLD OF GENERATION OF A LASER BEAM

BACKGROUND OF THE INVENTION

In the operation of lasers, especially those emitting non-visible beams, it is important to know when the laser starts to generate laser beams, that is the threshold of lasing action. Also, it is desirable to determine the nature of lasing action, location of the beam for alignment of optical components and the radial profile of the beam. In the prior art, this was done haphazardly and with what was available, such as a black exposed "Polaroid" type film, which comprises a black film mounted on a white backing material. When the exposed black film was placed in the beam path, the beam would vaporize or burn off areas of the black film whereat the laser beam would impinge. An outline of the beam's cross-section or profile would thus appear on the film backing as a burned region.

Although this generally used method is inexpensive, there is a substantial deficiency and disadvantage, namely, that when the laser beam burns off the black material, the film is vaporized and smoke particles are ejected into the atmosphere. When the beam hits the black material, there is a popping noise and smoke is generated. Thus, there is a visual and audio indication that a laser beam is being generated. The particles fly about, and in many cases, fall unto the optical surfaces of the laser apparatus. Although the particles may be small, over a period of time, there is an accumulation of particles and the optical devices are damaged by the high power laser beam concentrating energy at the contaminated spots.

SUMMARY OF THE INVENTION

Accordingly, an object of the invention is to eliminate the deficiencies and disadvantages of the prior art.

A further object is to provide a disposible threshold detector which would not contaminate the atmosphere when used.

A still further object is to provide a disposible indicator means for determining the location of a non-visible laser beam and its radial profile and energy characteristics.

The foregoing and other objects of this invention are attained in an illustrative embodiment of the invention which encompasses a method and device for detecting the threshold of generation of a non-visible laser beam. A dark material is enclosed within a cover having at least the side exposed to the laser beam of transparent material. The device is placed within the path of the laser beam. When the laser reaches threshold and a laser beam is generated, the beam will hit the dark layer and burn off the dark material thereat. The particles which are thrown off are trapped between the backing material and the transparent covering layer. Advantageously, no contaminant will reach the surrounding atmosphere. Also, advantageously, the radial characteristics of the beam can be determined from the profile of the burned off area.

A feature of the invention is a method of detecting the threshold of generation of a non-visible laser beam by using a dark, such as black, film or layer enclosed in a container having the side exposed to the laser beam path, of transparent material.

A further feature is a disposible device for detecting the threshold of generation of a non-visible laser beam, comprising a dark layer and having a transparent layer on one side with an air space therebetween, and of an area substantially larger than the laser beam cross section.

A further feature is a dark film or layer mounted on a non-dark, such as white, backing and enclosed with a glass layer over the dark film or layer.

DETAILED DESCRIPTION OF PREFERRED EMBODIMENTS

Figure 1A:
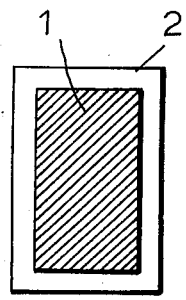
FIGS. 1A and 1B depict a dark opaque film on a substantially non-dark, such as white, backing material before and after exposure to a laser beam.

Turning now to the drawing, in FIG. 1A, there is depicted a dark colored opaque, such as black, film or layer 1 bonded or otherwise attached to a non-dark, such as white, backing material 2, such as for example heavy paper stock or transparent glass. This could be, for example, an exposed "Polaroid" film which is generally available in most laboratories. The black film has not yet been exposed to a laser beam.

Figure 1B:
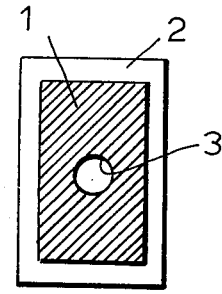

In FIG. 1B, there is depicted film 1 after exposure to a laser beam. The laser beam, such as laser beam 4 in FIG. 2, can be of a pulse type and upon contacting the dark film 1, causes the film or layer 1 to be burned in areas of contact. Thus, as depicted in FIG. 1B, a substantially circular hole 3, is shown where the beam burned away the film material. Close examination of the burned area 3 will disclose parts which may be hot spots (that is the burned off area will be lighter and more intense) and also the profile of the beam. Suitable application of these properties can be made.

Figure 2:
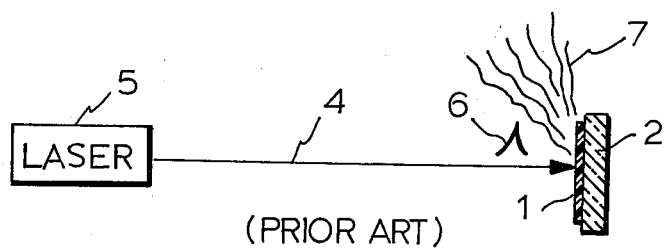
FIG. 2 depicts the problem encountered with prior art threshold detecting devices.

In FIG. 2, there is depicted laser apparatus 5, which may be of the single pulse laser using as the active element, ruby, YAG, neodimium glass. Laser 5 emits pulses, such as shown by wave 6, in beam 4.

When pulse 6 of laser beam 4 strikes the dark film 1, the film is burned and smoke vapors and particles 7 are thrown off as shown in FIG. 2. This causes the vapors and particles to travel through the atmosphere and become deposited on different equipment, such as the optical parts of the laser system. Thus, disadvantageously, in the prior art, various equipment are subject to contamination by the burned off particles. In many cases, the burned off particles would land on the optical devices of the laser apparatus, and cause them to become damaged.

Figure 3:
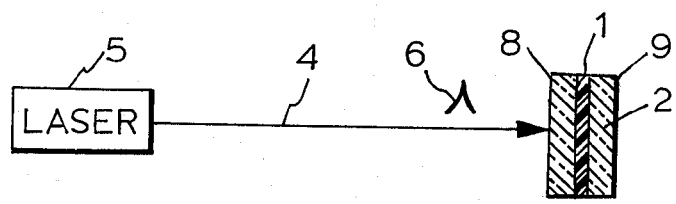
FIG. 3 depicts an illustrative embodiment of this invention.
Figure 4A:
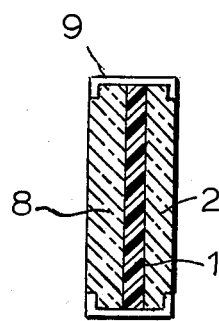
FIGS. 4A and 4B depict use of the illustrative embodiment where no contaminants are emitted when the laser beam impinges on the dark burnable material.
Figure 4B:
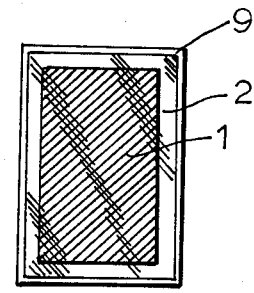

FIG. 3 depicts an embodiment of the invention, wherein a burnable film or layer 1 having a backing layer 2 of non-burnable material is enclosed on the side facing the laser beam 4 with a transparent (i.e. transparent to the laser beam) material 8. The film or layer 1 is of a burnable material (i.e. burnable by the laser beam) such as carbon black suspended in a suspension material. The layer 2 is of a material which is not burnable by the laser beam, such as glass, plastic, white card, and the like. The layer 1 may be suitably attached to the backing layer 2, such as by bonding, glueing, etc. The area of the transparent layer 8 is substantially larger than the cross section of the laser beam so that material burned off of film 1 by laser beam 4 will not escape into the atmosphere, but instead, will be held by layer 8. The edges of the transparent layer 8 and backing layer 2 which together hold therebetween the layer of burnable material 1, may be suitably sealed with any suitable sealant, such as epoxy, or with tape. See for example, FIGS. 4A and 4B which show a disposible device wherein transparent layer 8, film 1 and backing 2 are sealed at the edges 9 with a taping or other sealing material. The burnable layer 1 should not extend to the edges of backing layer 2 and transparent layer 8 in order that material burned from layer 1 toward the edges thereof would be held by layer 8. All four edges of the layers 8 and 2 need not be sealed provided there is sufficient distance between the edges of layer 1 and the edges of layers 8 and 2, so that burning of the layer 1 toward the edges thereof would not cause the material to escape into the atmosphere. It is preferable that the transparent layer 8 be securely attached to backing layer 2. There may be an air space between the transparent layer 8 and the burnable layer 1.

The backing layer 2 may be of any non-burnable material, such as white card, plastic or transparent glass and the like. The material should not be subject to burning by the laser beam which burns the burnable material layer 1 when the beam hits the layer 1. The burnable target material 1 may be coated in a suitable manner on the non-burnable layer 2, and when such layer 1 is burned by impinging of the laser beam thereon, the non-burnable layer 2 would remain substantially unaltered. The particles from the burned off areas will be thrown off and be disposed about burned off areas.

The laser 5 being tested for threshold of beam generation will generate a non-visible laser beam 4. In operation, when it is desired to determine when the laser 5 is generating a beam, that is lasing, the operator will place the detecting target device into the beam path with the transparent layer 8 turned toward the beam 4. When the laser 5 starts to lase, a popping noice will occur in the detecting target device, and the area of the burnable layer which is hit by the beam 4 will become vaporized and a substantially circular hole will be burned therein. Advantageously using the invention, there will be no smoke vapors or particles escaping into the atmosphere. The layer 8 will trap the smoke vapors and particles. Advantageously, because the device can be economically produced, after a few detection tests, the device can be discarded.

The transparent layer 8 may also be of flexible plastic or other material depending upon the power output of the laser 5. The thickness and other properties of the layer 8 should be such that the laser beam will pass through layer 8 without burning same. The burnable layer 1 should be such that when the laser beam hits the layer, burnable material thereat will be burned off.

The foregoing description is illustrative of the principles of the invention. Numerous other extensions and modifications thereof would be apparent to the worker skilled in the art. All such extensions and modifications are to be considered to be within the spirit and scope of the invention.

What is claimed is:

1. A laser threshold detecting device comprising a layer of burnable material held by a backing layer of non-burnable material, said burnable and non-burnable being by a laser beam generated by a laser, and covered by a transparent layer, said transparent layer and said layer of burnable material being larger in area than the cross section of said laser beam whose threshold of generation is being detected, and means for holding said transparent layer closely adjacent to said layer of burnable material, whereby said device is insertable into the beam path of a laser being tested, said beam upon generation then passing through said transparent layer and impinging upon the layer of burnable material to cause vaporization thereat to a depth of the entire burnable layer at points of contact and said transparent layer acting to prevent the vaporized material from escaping into the surrounding atmosphere.

2. The device of claim 1, wherein the edges of said transparent layer and the backing layer are of similar dimensions, and the four edges thereof are sealed, thereby to tightly encase said burnable layer therein.

3. The device of claim 1, wherein said transparent layer comprises glass.

4. The device of claim 3, wherein said backing layer comprises glass.

5. A laser threshold detecting device comprising a layer of burnable material held by a backing layer of non-burnable material and covered by a transparent layer, said transparent layer and said layer of burnable material being larger in area than the cross section of a laser beam whose threshold of generation is being detected, and means for holding said transparent layer closely adjacent to said layer of burnable material, whereby said device is insertable into the beam path of a laser being tested, said beam upon generation then passing through said transparent layer and impinging upon the layer of burnable material to cause its vaporization at points of contact and said transparent layer acting to prevent the vaporized material from escaping into the surrounding atmosphere; wherein said backing layer comprises glass and wherein said burnable layer comprises carbon black suspended in a suspension material.

6. A laser threshold detecting device comprising a layer of burnable material held by a backing layer of non-burnable material and covered by a transparent layer, said transparent layer and said layer of burnable material being larger in area than the cross section of a laser beam whose threshold of generation is being detected, and means for holding said transparent layer closely adjacent to said layer of burnable material, whereby said device is insertable into the beam path of a laser being tested, said beam upon generation then passing through said transparent layer and impinging upon the layer of burnable material to cause its vaporization at points of contact and said transparent layer acting to prevent the vaporized material from escaping into the surrounding atmosphere, wherein said transparent layer is disposed to have an air space between it and said layer of burnable material.

7. The device of claim 3, wherein the edges of said layer of burnable material are at distances from the edges of said transparent layer that burning of the edges of said burnable layer by said laser beam will not result in any escaping of the burned material.

8. In a method of detecting the threshold of generation of a non-visible laser beam, wherein a laser beam is projected onto a layer of burnable material to burn a pattern thereon; the improvement comprising the sealing of said layer of burnable material in a sealed transparent container whereby particles burned by said laser beam from said layer of burnable material are retained in the sealed transparent container.

9. The method of claim 8, wherein said transparent container is glass.

10. The method of claim 8, wherein said transparent container is plastic.

11. The method of claim 8, wherein said burnable material is carbon black in a suspension material.

12. The method of claim 8, wherein said layer of burnable material is mounted on a non-burnable material layer with said transparent container covering said layer of burnable material in the direction of said laser beam exposure.

* * * * *